(No Model.)
F. T. VAN WOERT.
ARTIFICIAL TOOTH.
No. 441,265.        Patented Nov. 25, 1890.
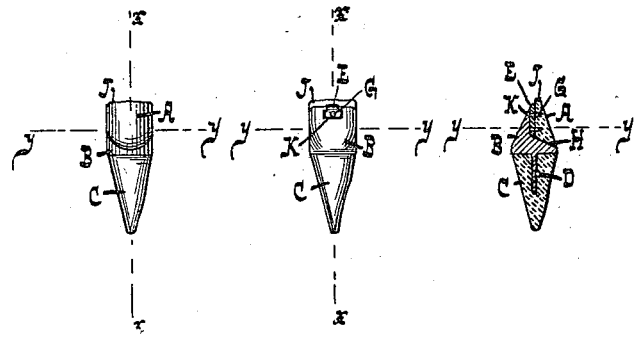
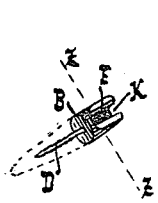
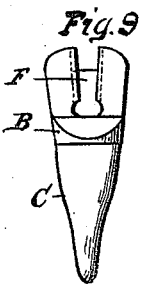
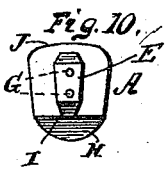
WITNESSES:
William J. Miller
Edward Wolff
INVENTOR:
Frank T. Van Woert
BY
Van Santvoord & Hauff
ATTORNEYS

UNITED STATES PATENT OFFICE.

FRANK T. VAN WOERT, OF BROOKLYN, NEW YORK.

ARTIFICIAL TOOTH.

SPECIFICATION forming part of Letters Patent No. 441,265, dated November 25, 1890.

Application filed January 13, 1890. Serial No. 336,781. (No model.)

*To all whom it may concern:*

Be it known that I, FRANK T. VAN WOERT, a citizen of the United States, residing at Brooklyn, in the county of Kings and State of New York, have invented new and useful Improvements in Artificial Teeth, of which the following is a specification.

This invention relates to artificial teeth, and has for its object to provide novel means for attaching the crown to the backing without the employment of solder or cement, which are unwholesome, disagreeable, and otherwise objectionable. To accomplish this object the invention involves the features of construction, the combination of parts, and the principles of operation hereinafter described and claimed, reference being made to the accompanying drawings, in which—

Figure 1 represents a front view of a tooth containing my invention. Fig. 2 represents a rear view thereof. Fig. 3 is a longitudinal section taken on the line $xx$ of Figs. 1 and 2. Fig. 4 represents the inner face of the crown of an artificial tooth, the crown being detached from the backing. Fig. 5 represents the inner face of the backing detached from the crown, the root being shown in dotted outline. Fig. 6 is a cross-section on the line $y\ y$ of Figs. 1, 2, and 3. Fig. 7 is a cross-section on the line $zz$ of Fig. 5. Fig. 8 is a cross-section on the line $o\ o$ of Fig. 4. Fig. 9 is an elevation of the root of the tooth, showing the tapering recess; and Fig. 10 is an elevation of the crown of the tooth, showing the tapering locking-gib.

The letter A designates the crown or front of an artificial tooth, of which B is the backing, and C is the root. The backing B is preferably made of metal, and is firmly connected to the root C by means of a pin D, which is inserted in a cavity made for it in the root. The crown is of porcelain, and is secured to the backing B by means of a tapering dovetailed locking-gib E, which is made on the inner face of the crown and is inserted into a recess F formed in the backing to receive it, the recess being the counterpart of the gib in shape and dimensions, so that the gib will fit in the recess. The gib is preferably made of metal, and is fastened to the crown by means of platinum or other suitable pins G, which may be embedded at one end in the porcelain crown, as shown in Fig. 3, while their other ends are riveted or soldered to the gib.

The dovetailed forms of the gib and of the recess of the backing into which the gib is inserted are shown in the cross-section, Fig. 6. In securing the crown to the backing the upper end H of the crown is presented at the lower end of the backing in such manner that the narrow upper end I of the gib will enter the open end or mouth of the recess F, and by pushing the gib upward into the recess in the direction of the length of the tooth-root the dovetail sides of the gib are caused to slide along between the sides of the recess, sufficient force being used by blows of a mallet or other suitable means to drive the gib up into the recess, so as to bring their sides into close contact and so that they will be held to each other by frictional contact of sufficient degree to prevent them from working apart from ordinary use.

The rear part of the backing is tapered down to a thin edge where it approaches the cutting-edge J of the crown, and said thin edge of the backing is cut away at K at the mouth of the recess F, and the lower end of the gib is beveled off flush with the thin edge of the backing.

The exterior of the backing for the several teeth of the denture is so made as to size and shape that it will be in harmony with the rest of the work. The example of my invention here shown will be a sufficient guide to enable any person skilled in the art to apply it to single teeth, and to bridge-work as well as to entire sets of teeth. It is obvious that my invention enables me to replace a broken crown of a denture without interfering with any other crown or tooth in the work.

I do not restrict my invention to forming the locking-gib upon the crown or face of the tooth and the recess on the back or other part of a tooth, but claim the locking-gib and recess on whatsoever parts of the tooth they are placed, as the gib may be placed on the backing and the recess be formed on the crown, and, furthermore, the gib and recess may be of various forms, provided they are locked to each other on the principle of a dovetail joint by a gib or gibs adapted to slide in a recess or groove of coincident slots or mortises.

My invention enables me to dispense with cement or solder in securing the crowns or faces to other parts of artificial teeth.

What I claim as new, and desire to secure by Letters Patent, is—

In artificial teeth, the combination of the crown having a tapering dovetailed gib with the backing having a tapering dovetailed groove into which the tapering gib is forced lengthwise and held by friction alone to avoid the employment of cement or solder, substantially as described.

In testimony whereof I have hereunto set my hand in the presence of two subscribing witnesses.

FRANK T. VAN WOERT.

Witnesses:
J. VAN SANTVOORD,
WM. H. JANES.